United States Patent [19]
Tobita

[11] Patent Number: 5,654,948
[45] Date of Patent: Aug. 5, 1997

[54] DISC APPARATUS FOR RECORDING/REPRODUCING WITH ZONE CONSTANT ANGULAR VELOCITY

[75] Inventor: Minoru Tobita, Tokyo, Japan

[73] Assignee: Sony Corporation, Tokyo, Japan

[21] Appl. No.: 433,340

[22] PCT Filed: Sep. 7, 1994

[86] PCT No.: PCT/JP94/01473

§ 371 Date: Aug. 28, 1995

§ 102(e) Date: Aug. 28, 1995

[87] PCT Pub. No.: WO95/07532

PCT Pub. Date: Mar. 16, 1995

[30] Foreign Application Priority Data

Sep. 7, 1993 [JP] Japan ............... 5-247507

[51] Int. Cl.$^6$ ............................................. G11B 7/00
[52] U.S. Cl. ................. 369/48; 369/54; 369/58; 369/32
[58] Field of Search ............... 369/32, 50, 44.28, 369/47, 48, 44.26, 54, 58; 360/77.02, 77.03, 77.04, 78.04

[56] References Cited

U.S. PATENT DOCUMENTS

| | | | |
|---|---|---|---|
| 4,674,081 | 6/1987 | Gerard et al. | 369/275 |
| 4,819,218 | 4/1989 | Barnard | 369/50 |
| 4,858,221 | 8/1989 | Romeas | 369/275 |
| 4,896,311 | 1/1990 | Ishihara | 369/47 |
| 4,918,677 | 4/1990 | Ashinuma et al. | 369/32 |
| 4,991,163 | 2/1991 | Tokushuku et al. | 369/275.4 |
| 5,036,408 | 7/1991 | Leis et al. | 360/48 |
| 5,107,473 | 4/1992 | Fuji et al. | 369/32 |
| 5,124,967 | 6/1992 | Isaka et al. | 369/48 |
| 5,170,385 | 12/1992 | Senshu et al. | 369/48 |
| 5,172,357 | 12/1992 | Taguchi | 369/48 |
| 5,179,547 | 1/1993 | Komaki et al. | 369/275.4 |
| 5,193,034 | 3/1993 | Tsuyoshi et al. | 360/51 |
| 5,199,023 | 3/1993 | Yamamoto et al. | 369/275.4 |
| 5,206,847 | 4/1993 | Kanda | 369/44.13 |
| 5,214,629 | 5/1993 | Watanabe et al. | 369/44.26 |
| 5,233,590 | 8/1993 | Ogawa | 369/48 |
| 5,237,554 | 8/1993 | Shenshu et al. | 369/59 |
| 5,255,261 | 10/1993 | Iida et al. | 369/275.3 |
| 5,255,263 | 10/1993 | Van Uijen et al. | 369/275.3 |
| 5,278,814 | 1/1994 | Deguchi et al. | 369/47 |
| 5,283,776 | 2/1994 | Takagi | 369/44.28 X |
| 5,295,127 | 3/1994 | Verboom et al. | 369/58 |
| 5,343,453 | 8/1994 | Ogino | 369/44.26 X |
| 5,363,351 | 11/1994 | Tobita et al. | 369/13 |
| 5,388,090 | 2/1995 | Hoshino et al. | 369/275.3 |
| 5,400,309 | 3/1995 | Satomura | 364/47 X |
| 5,416,766 | 5/1995 | Horimai | 369/116 |
| 5,418,768 | 5/1995 | Shensu | 369/59 |
| 5,436,770 | 7/1995 | Muto et al. | 360/51 |
| 5,440,474 | 8/1995 | Hetzler | 369/275.3 X |
| 5,488,593 | 1/1996 | Furumiya et al. | 369/50 X |
| 5,506,827 | 4/1996 | Tobita | 369/59 |
| 5,524,103 | 6/1996 | Shimizu et al. | 369/59 |

FOREIGN PATENT DOCUMENTS

0201093 A1  12/1986  European Pat. Off.
0269381 A3  6/1988  European Pat. Off.

(List continued on next page.)

OTHER PUBLICATIONS

Patent Abstracts of Japan, vol. 17, No. 536, Sep. 27, 1993, JP 5-144184, (Sony Corp.), Jun. 11, 1993.
Patent Abstracts of Japan, vol. 17, No. 78, Feb. 16, 1993, JP 4-281242, (Matsushita Electric), Oct. 6, 1992.
Patent Abstracts of Japan, vol. 9, No. 76, Apr. 5, 1985, M. Yamamoto et al., Sony K.K., JP 59-207433.

Primary Examiner—Thang V. Tran
Attorney, Agent, or Firm—Limbach & Limbach

[57] ABSTRACT

A disc apparatus for recording and/or reproducing data applying the sample servo method and the zone CAV method which can detect sectors easily and accurately. In the present invention, the data volume DA and DB recordable in each segment SGA, SGB, and SGC is previously stored, read out synchronously with the scanning of the optical beam, and accumulatively added. Thus, the sector is detected based on the result of accumulative addition.

8 Claims, 10 Drawing Sheets

FOREIGN PATENT DOCUMENTS

| | | |
|---|---|---|
| 0390601 A2 | 10/1990 | European Pat. Off. . |
| 0461668 A2 | 12/1991 | European Pat. Off. . |
| 0517230 A2 | 12/1992 | European Pat. Off. . |
| 2635401 | 8/1988 | France . |
| 3717604 A1 | 11/1987 | Germany . |
| 3809223 A1 | 10/1988 | Germany . |
| 58-166538 | 10/1983 | Japan . |
| 59-116911 | 7/1984 | Japan . |
| 63-220481 | 9/1988 | Japan . |
| 63-220482 | 9/1988 | Japan . |
| 2-189742 | 7/1990 | Japan . |
| 2-189746 | 7/1990 | Japan . |
| 2-189769 | 7/1990 | Japan . |
| 2-179980 | 7/1990 | Japan . |
| 2-260285 | 10/1990 | Japan . |
| 2-260286 | 10/1990 | Japan . |
| 3-130968 | 5/1991 | Japan . |
| 3-130985 | 6/1991 | Japan . |
| 4-092258 | 3/1992 | Japan . |
| 4-362575 | 12/1992 | Japan . |
| 5-36208 | 2/1993 | Japan . |
| 5-135507 | 6/1993 | Japan . |
| 5-144194 | 6/1993 | Japan . |
| 5-314664 | 11/1993 | Japan . |
| 6-28776 | 2/1994 | Japan . |
| 6-150569 | 5/1994 | Japan . |
| 6-195878 | 7/1994 | Japan . |
| 6-259778 | 9/1994 | Japan . |

DISC APPARATUS FOR RECORDING/ REPRODUCING WITH ZONE CONSTANT ANGULAR VELOCITY

TECHNICAL FIELD

The present invention relates to a disc apparatus, and more particularly is applicable to a disc apparatus which records and/or reproduces data on and/or from a disc-shaped recording medium by utilizing a zone CAV (constant angular velocity) method.

BACKGROUND ART

Heretofore, in the disc apparatus which records data on the disc-shaped recording medium or reproduces recorded data, there are two methods: a method for rotationally controlling the recording medium by CLV (constant linear velocity); and a method for rotationally controlling the recording medium by CAV (constant angular velocity).

CAV control method is easier to control velocity as compared with CLV control method. Further, since being able to record and reproduce control data such as track address at regular intervals, CAV control method has the advantage that track search can be executed easily. However, in CAV control method, the recording density is decreasing as recording and/or reproducing of data goes to the outer circumference, so that the total amount of recording information is deteriorated as a whole.

As a method for solving the problem, there has been proposed a zoning recording method. In the zoning recording method, data recording area of a disc is divided into a plurality of zones from the inner circumference side to the outer circumference side, and the data is recorded/reproduced with same clock frequency in track of each zone, and with changed clock frequency in track of different zone. More specifically, the clock frequency is increased as it goes from the inner circumference zone to the outer circumference zone in order to stand in proportion to the distance from the center of the disc to that zone. Therefore, it is possible to equalize the recording density of the inner circumference and the outer circumference.

This prevents from decreasing the amount of recording information at the outer circumference which has been a drawback of the CAV control.

As recording format of a disc-shaped recording medium, there are a continuous servo method and a sample servo method. In the sample servo method, the recording area is divided into servo area and data area, and reference clock and tracking error signal and the like which are standard of recording/reproducing are extracted based on the information recorded in the servo area. Actually, the servo area is formed at the center of the track, and is composed of pit for extracting clock information, and wobbling pit for extracting tracking error signal which is formed Off setting the fixed distance from the track center toward the inner circumference and the outer circumference. These pits are previously formed when the disc is made (prepit).

Heretofore, a disc-shaped recording medium using the zoning recording method and the sample servo method described above in combination is proposed (hereinafter, referred to as "zone CAV"). In aforementioned recording medium, the servo area is formed radially, and also address data area is formed radially.

Therefore, in the disc apparatus which records and reproduces the data, the reference clock is extracted from the servo area in and from this type of recording medium, thus the data can be recorded and/or reproduced based on extracted clock information in each zone under the condition of constant angular velocity. Further, address data area formed radially is detected, so that position of recording and/or reproducing can be found and further the address can be easily read while seeking.

In zoning applying a continuous servo method, ID (identification information) is invariably recorded at the top of sector in every zone. Therefore, in the disc apparatus which records and reproduces data on and from this type of recording medium, by detecting the interval from an ID to another ID, the unit sector can be easily detected.

On the contrary, in the disc apparatus which records and reproduces the data by the zone CAV applying aforementioned sample servo method, the interval from a servo area to another servo area is allotted as one segment, which is the segment including, for example, address data and the user data, or the segment of only the user data, or the segment of only address data. Therefore, the number of recordable byte of the user data is different from each segment and each zone. Consequently, sector which is the minimum unit of recording/reproducing can not be a fixed cycle, and there occurs a problem that the detection of the sector becomes difficult.

As one of the methods to solve this problem, the disc apparatus can be considered, which counts up the byte counter in every segment, and Generates sector pulse when the number of byte corresponding to one sector is obtained, thus detects sector. However, even in this manner, since there is shift of timing between at recording and at reproducing, the sector pulse is also shifted at recording and at reproducing. Therefore, a synchronizing circuit with very complicated construction is required.

DISCLOSURE OF INVENTION

The present invention has been done considering the above points and is proposing a disc apparatus which can detect sector surely and easily even when recording and/or reproducing the data applying the sample servo method and the zone CAV method.

To obviate such problems, first according to the present invention, a disc apparatus 2 performing access of information with the zone CAV method on a disc-shaped recording medium 1 which is divided into a plurality of zones ZO0, ZO1, ZO2, . . . in the radial direction to form servo area SB radially in every zone, and further to form the recording area DATA of one segment between respective servo areas SB, provides: access means 5 for performing access of information signal toward the disc-shaped recording medium 1 by the sector unit composed of N segment (N is a positive integer); segment data volume setting means 16 for setting data volume DA and DB corresponding to the kinds and the zones in every segment SGA, SGB, and SGC formed between respective servo areas SB; accumulation adding means 25 and 26 for accumulatively adding the data volume DA from a reference segment provided at least one in each zone and the data volume DB corresponding to the access position of the access means 5 by segment unit; sector data volume setting means 16 for setting a comparing value showing the data volume of sector BYTE in every zone; sector detection signal outputting means 27 for outputting the sector detection signal SEC when value of accumulation and addition by the accumulation adding means 25 and 26 becomes the comparing value BYTE; reset means 26 for resetting the value of accumulation and addition according to the sector detection signal SEC; and sector number detection means 29 for detecting accessing sector number SECNO of the access means 5 according to the sector detection signal SEC.

Furthermore, secondly according to the present invention, sector number data setting means 16 for setting per zone the sector number data SEC/TR showing the number of recordable sector in one track, and mask means 34 and 28 for masking the sector detection signal SEC when the sector number data SEC/TR and the sector number SECNO become predetermined relation, are provided.

Furthermore, thirdly according to the present invention, the segment data volume setting means 16 provides first registers 22 and 23 for storing segment data DA and DB showing the data volume in each kind of segment SGA, SGB, and SGC to the zone presently being accessed by the access means 5, and second registers 20 and 21 for storing the segment data DA and DB in each kind of segment SGA, SGB, and SGC to the zone to be accessed next time by the access means.

As access position of the access means 5 moves, the accumulation adding means 25 and 26 accumulatively add the data volume DA and DB in every segments SGA, SGB, or SGC located on the moving route. Here, in the disc-shaped recording medium 1 with the zone CAV method, the data volume recordable in the segment is different from each other according to the kind of zone and segment, so that it is difficult to detect the sector. However, in the disc apparatus 2 of the present invention, the segment data volume DA and DB, which are in accordance with the zone and the type of segment, are sequentially read out from the segment data volume setting means 16 to accumulatively add by segment unit, so that the segment data on the moving route of the access means 5 can be easily obtained. And when the obtained data becomes the comparing value BYTE set in the sector data volume setting means 16, the sector detection signal SEC is output. As a result, the sector can be detected surely and easily.

BEST MODE FOR CARRYING OUT THE INVENTION

Figure 1A:
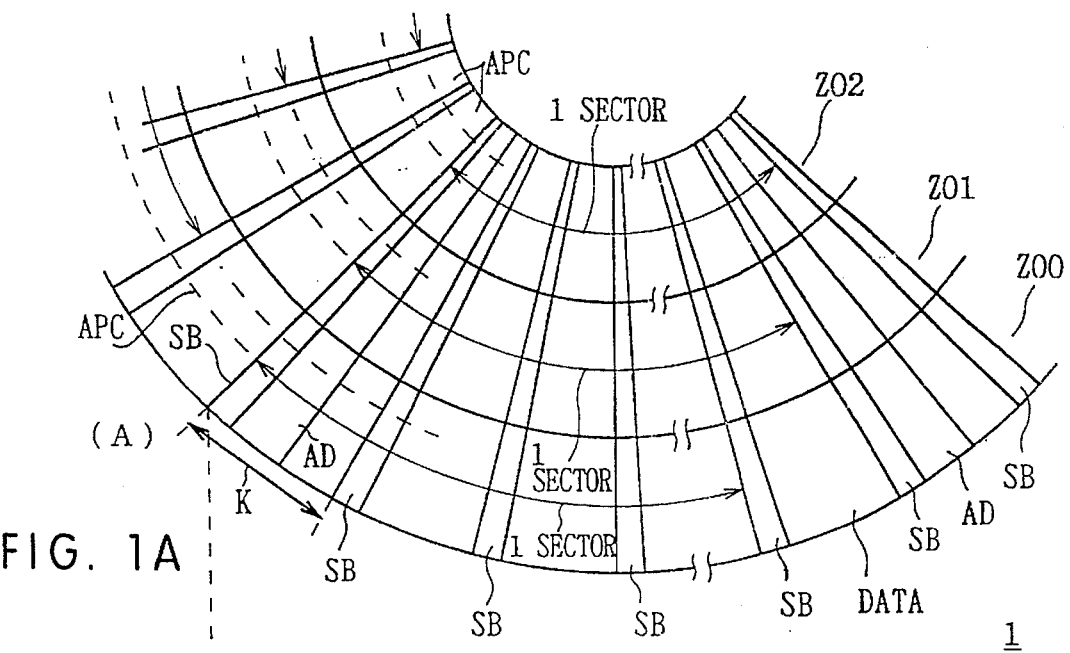
FIGS. 1(A) to (D) are schematic diagrams showing an optical disc which applies to an optical disc apparatus according to one embodiment of the present invention.

Referring to the drawings, one embodiment of the present invention will be hereinafter described in detail.
(1) Construction of Optical Disc In FIG. 1, 1 shows an optical disc which applies to the disc apparatus according to the present invention. The optical disc 1 is capable of recording and reproducing, and is applied the method of thermal magnetic recording, in which servo pattern of sample format is recorded upon preformatting. More specifically, in the optical disc 1, servo areas SB with the fixed angle separation is formed, and servo areas SB divides the information recording face to form 960 segments around a circle.

On the optical disc 1, recording tracks is spirally formed sequentially from the outer circumference side to the inner circumference side and tracking can be controlled on the basis of the servo pattern. Furthermore, in this optical disc 1, address data AD is recorded by preformatting followed by servo area SB with a cycle of ten segments.

In the area in which address data is recorded, there are two areas: radial information area in which the address information regarding the radial direction, i.e., the track number is recorded; tangential information area in which the address information regarding the tangential direction, i.e., the angular information is recorded.

In the optical disc 1, remaining area except for the servo area SB and address data AD is allocated to the area for recording and reproducing user data.

Furthermore, in the optical disc 1, the recording area is divided circularly to form a plurality of zones ZO1, ZO1, ZO2, . . . . When recording and reproducing, frequency of the data clock is changed in each zone to record and reproduce the user data. Therefore, the recording density can be improved in utilizing the recording area effectively.

Here, in the optical disc 1, one sector is formed with a plurality of segments. To record a fixed user data in one sector, the optical disc 1 sequentially increases the number of segment forming one sector from the outer circumferential zone to the inner circumferential zone. In FIGS. 1(B) to 1(D), the servo area SB is shown with hatching.

In addition, in the optical disc 1 of the embodiment, sectors are allotted on one line out of address data AD allocated radially so as to put the tops of all sectors in order. Here, the top segment of all top sectors is referred to as a reference segment K.

Figure 1B:
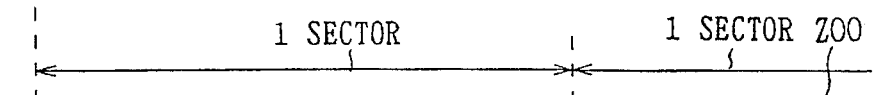
Figure 1C:
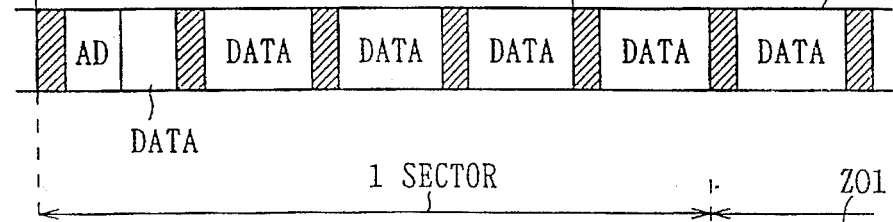
Figure 1D:
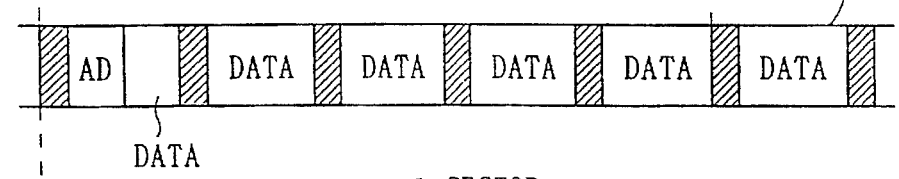

When the sector is constructed in this manner, as shown in FIG. 1(A), remaining segment which cannot construct sector is made on left side of the reference segment K, so that, in the optical disc 1, this segment is allotted as the sample area APC of the optical beam.

(2) General Construction of Optical Disc Device

Figure 2:
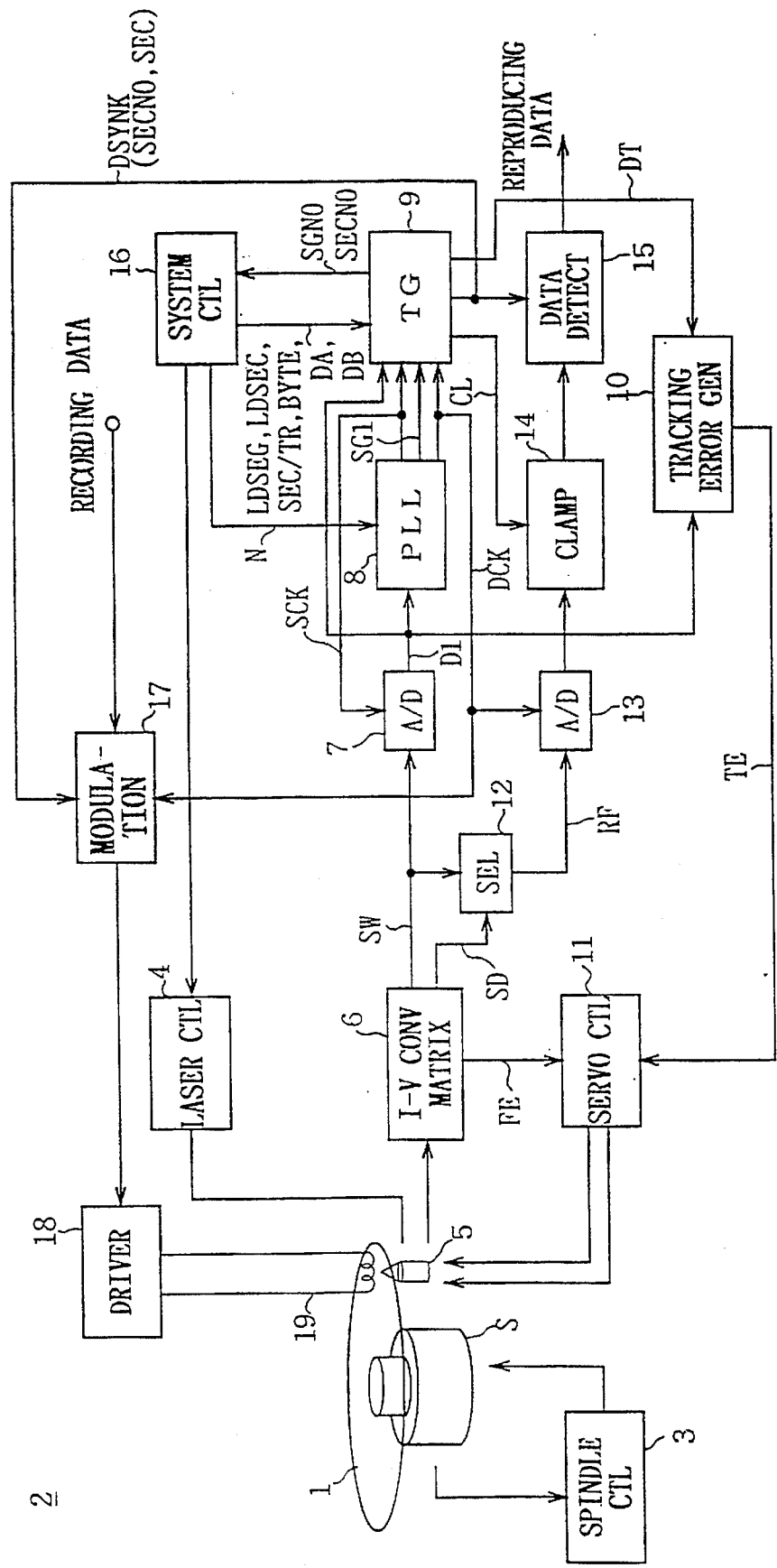
FIG. 2 is a block diagram showing the optical disc apparatus of the embodiment.

In FIG. 2, the optical disc apparatus 2 records data on the optical disc 1 in utilizing the zone CAV method, and reproduces the data recorded on the optical disc 1. The optical disc apparatus 2 chucks the optical disc 1 to a turntable and rotationally drives a spindle motor S by a spindle motor control circuit 3 in the state of constant angular velocity.

First, the description will be made about a reproducing system. The optical disc apparatus 2 drives an optical pickup 5 to irradiate optical beam to the optical disc 1 by controlling the operation of laser diode which is built in the optical pickup 5 by a laser control circuit 4. Incidentally, the laser control circuit 4 is controlled by a system control unit 16.

At this point, the optical pickup 5 converts the optical beam emitted from the laser diode to the parallel beam, transmits it through the prescribed beam splitter, and further focuses this optical beam into the optical disc 1 by an object lens. Consequently, the reflection light obtained from the optical disc 1 is incided though the object lens to the beam splitter to be reflected. The reflection light is incided to a photo detector.

The photo detector receives reflection light upon decomposing into P wave component and S wave component. An I-V conversion matrix circuit 6 performs the addition and subtraction calculation processing after converting current/voltage of the output current of the received light element.

With this arrangement, the I-V conversion matrix circuit 6 generates focus error signal FE, sum signal SW of which signal level changes according to the quantity of reflection light, and difference signal SD of which signal level changes according to changes of polarized surface of reflection light, and then outputs them.

The I-V conversion matrix circuit 6 outputs the focus error signal FE to a servo control circuit 11, the difference signal SD to a selector 12, and the sum signal SW to the selector 12 and an analog-to-digital conversion circuit 7, respectively.

The selector 12 selects and outputs the sum signal SW when the optical disc 1 is only for reproducing. On the other hand, when the optical disc 1 can be used for both recording and reproducing, the selector 12 selects and outputs the sum signal SW while the optical beam is scanning in the servo area SB or the address area AD, and selects and outputs the difference signal SD while the optical beam is scanning in the data area DATA. Hereinafter, the output of the selector 12 is referred to as RF signal.

Thus, the optical disc apparatus 2 obtains reproducing signal of address data and servo area SB by selecting this sum signal SW, and further obtains reproducing signal of the user data recorded upon forming pits and obtains reproducing signal of the data thermal magnetic recorded by selecting difference signal SD.

The analog-to-digital converter 7 converts the sum signal SW to digital signal on the basis of the servo clock SCK. PLL circuit 8 generates the servo clock SCK and the data clock DCK on the basis of the digital signal D1.

Figure 3:
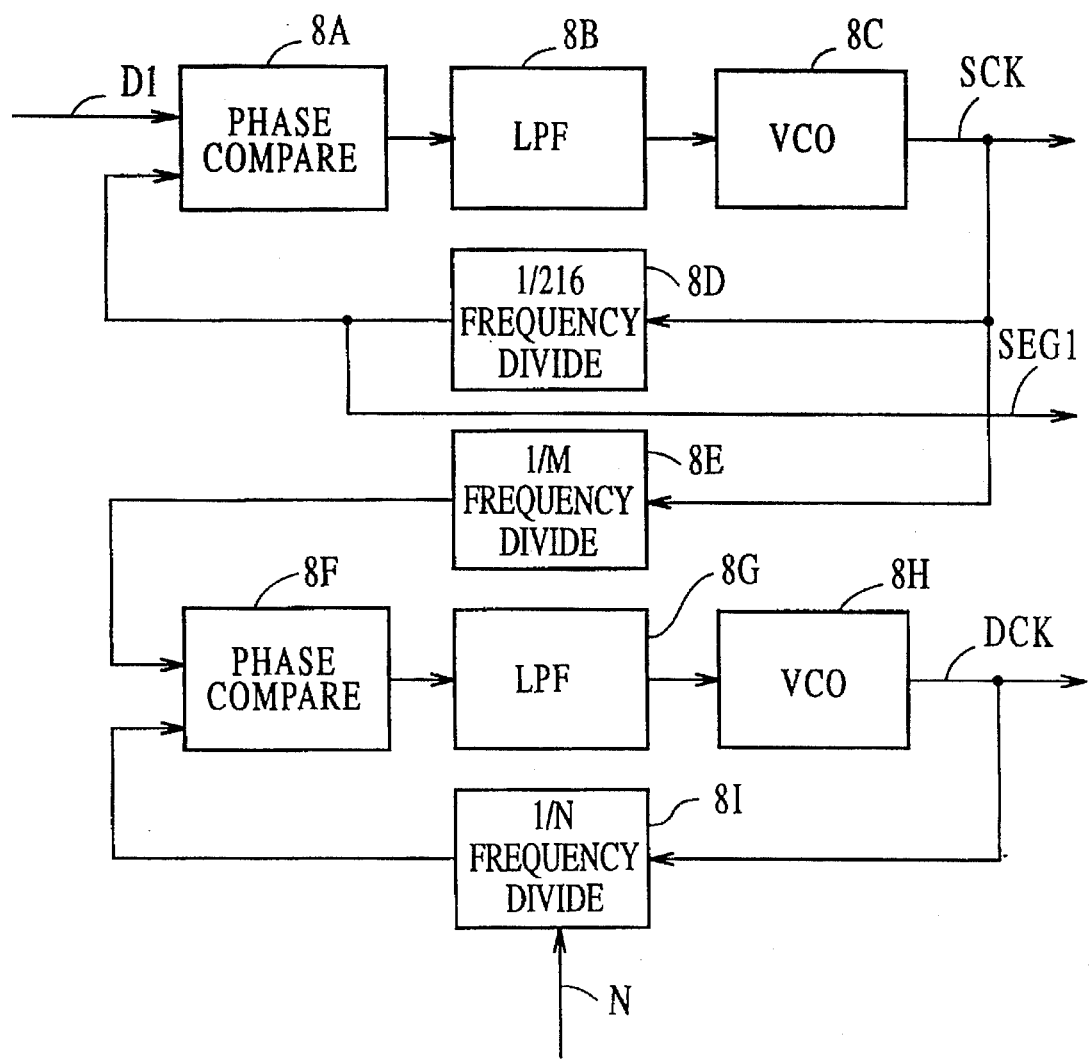
FIG. 3 is a block diagrams showing the construction of a PLL circuit.

PLL circuit 8 is constituted as shown in FIG. 3. PLL circuit 8 inputs the output from the analog-to-digital conversion circuit 7 to a phase comparator 8A. The output from a voltage control oscillator 8C is frequency-divided into 1/216 by a frequency divider 8D, and then is input to a phase comparator 8A. Then, comparison control voltage by the phase comparator 8A is supplied to the voltage control oscillator 8C via a loopfilter 8B to control oscillation frequency of the voltage control oscillator 8B. Then, the servo clock SCK is obtained as the output of the voltage control oscillator 8C, which is given to the analog-to-digital conversion circuit 7 and a timing generator 9. Therefore, the analog-to-digital conversion circuit 7 operates at the interval of 216 clock based on the servo clock SCK, thus can surely analog-to-digital convert the servo area which appears once in 216 clocks. The output of the frequency divider 8D is used for a first segment pulse SG1 described later.

Further, the output of the voltage control oscillator 8C is given to a phase comparator 8F via an 1/M frequency divider 8E. The output of a voltage control oscillator 8H is frequency-divided by an 1/N frequency divider 8I and is input to the phase comparator 8F. Then, comparison control voltage by the phase comparator 8F is supplied to the voltage control oscillator 8H via a loopfilter 8G to control oscillation frequency of the voltage control oscillator 8H. Then, the data clock DCK is obtained as the output of the voltage control oscillator 8H, which is given to an analog-to-digital conversion circuit 13, the timing generator 9, and a modulation circuit 17. Therefore, the analog-to-digital conversion circuit 13 converts reproducing signal RF composed of the output signal from the selector 12 to digital value and output it.

With this arrangement, PLL circuit 8 generates the data clock DCK based on the frequency dividing ratio setting data N which is changed by the system control unit 16 each time zone is changed, thus can shift the data clock DCK in each zone. Actually, it is arranged that frequency of the data clock DCK becomes higher in the more outer circumference side zone ZO0, ZO1, ZO2, . . . .

The timing generator 9 generates various reference signals which are necessary for operating the optical disc apparatus 2 based on the data clock DCK, the data clock SCK, and also reproducing signals SW, SD.

More specifically, the timing generator 9 transmits synchronizing signal DT, which rises at the timing of wobble pit, to a tracking error generation circuit 10, data synchronizing signal DSYNK to a data detection circuit 15 and the modulation circuit 17, and clamp pulse CL to a clamp circuit 14.

The tracking error forming circuit 10 captures output data D1 of the analog-to-digital conversion circuit 7 based on the synchronizing signal DT transmitted from the timing generator 9, so as to detect the difference signal of the output data from the wobble pit to transmit the difference signal as tracking error signal. TE to the servo control circuit 11. By moving the object lens of the optical pickup 5 up and down, and right and left based on the tracking error signal TE and the focus error signal FE obtained from the I-V matrix circuit 6, the servo control circuit 11 thus tracking controls and focus controls.

The clamp circuit 14 clamps the signal level of reproducing signal RF converted to the digital value by the analog-to-digital conversion circuit 13, so as to suppress D.C. fluctuation of reproducing signal RF. The data detection circuit 15, after equalizing waveform of the digital signal at the built-in digital equalizer, demodulates this digital signal by applying the method of Viterbi decoding. In this manner, the data detection circuit 15 demodulates the user data and outputs it as reproducing data.

At the time of recording, recording data is supplied via an input terminal to the modulation circuit 17. The modulation circuit 17 performs specified modulation on the recording data based on the data clock DCK and the data synchronizing signal DSYNK, and gives the modulated signal obtained above to a driver 18. The driver 18 drives a magnetic field impression head 19 in accordance with to the modulated signal. Therefore, the magnetic field impression head 19 impresses modulating magnetic field on the irradiation position of the optical beam to record the desired data on the optical disc 1.

In the case of recording and reproducing the user data with this manner, the optical disc apparatus 2 detects the track number depending upon the detected result of address data AD and detects sectors at the timing generator 9, and records and reproduces data on the desired position based on the detected result of the track number and sectors obtained above.

Figure 4:
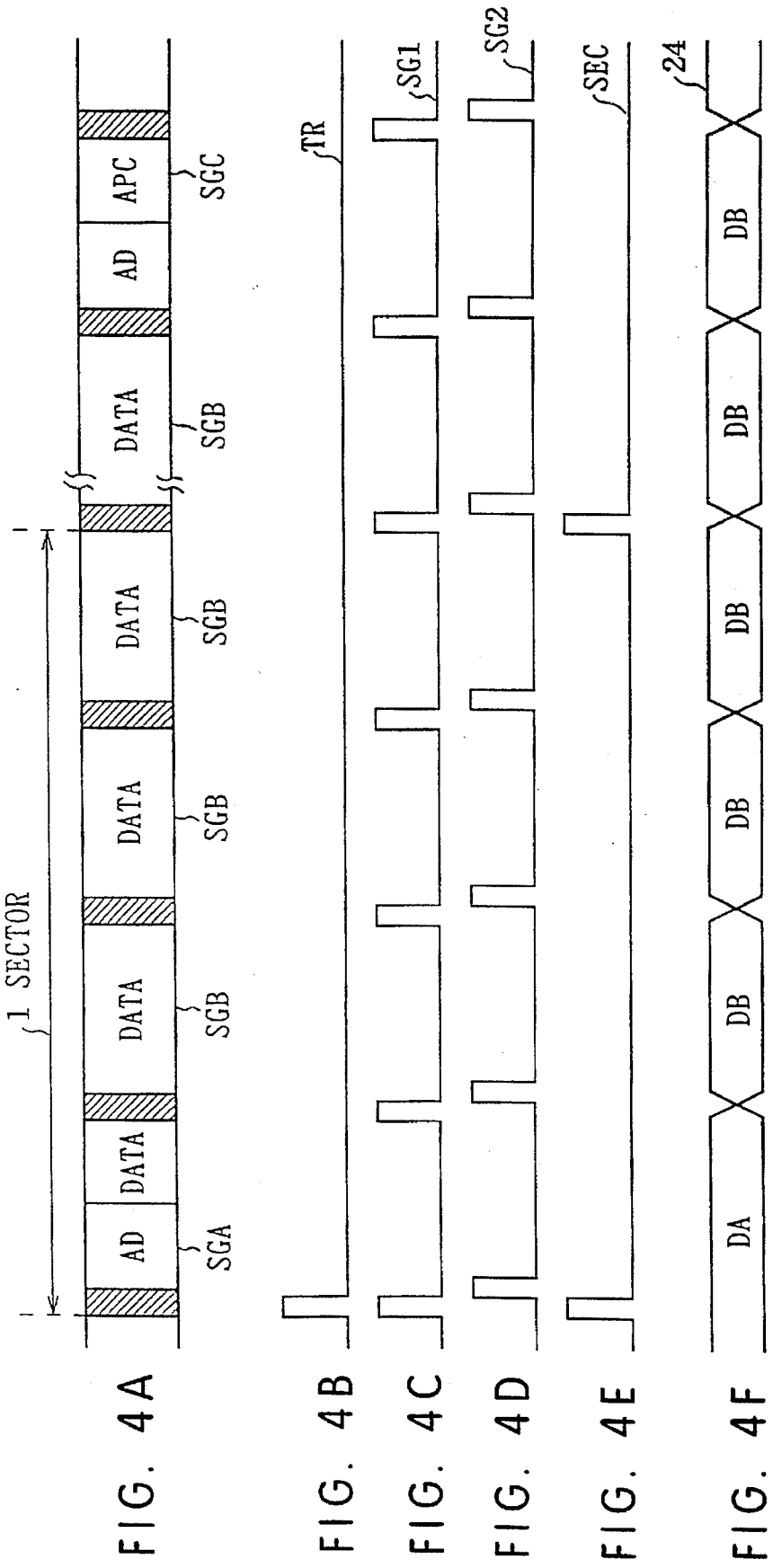
FIGS. 4(A) to 4(F) signal waveform diagrams explaining operation of the optical disc apparatus.

As described above, in the optical disc 1, sectors are formed per segments so that the fixed data volume can be allocated to each sector successively. Here, as shown in FIG. 4, these segments can be classified into one of the segment SGA allocated address data AD and the user data DATA, the segment SGB allocated only the user data DATA, and the sample segment SGC allocated no data.

Considering that the data volume recordable in each segment SGA to SGC is unconditionally determined in every zone ZO0, ZO1, ZO2, . . . , the optical disc apparatus 2 previously sets the segment data showing the data volume which is recordable in segments SGA and SGB, in the system control unit 16 in every zone ZO0, ZO1, ZO2, . . . . Also in the system control unit 16, the reference data BYTE showing the data volume for one sector is set.

The timing generator 9 accumulatively add the segment data Supplied from the system control unit 16 by segment unit, and generates the sector detection signal SEC (FIG. 3(E)) which rises when the result of accumulative addition becomes same value as sector data.

Figure 5:
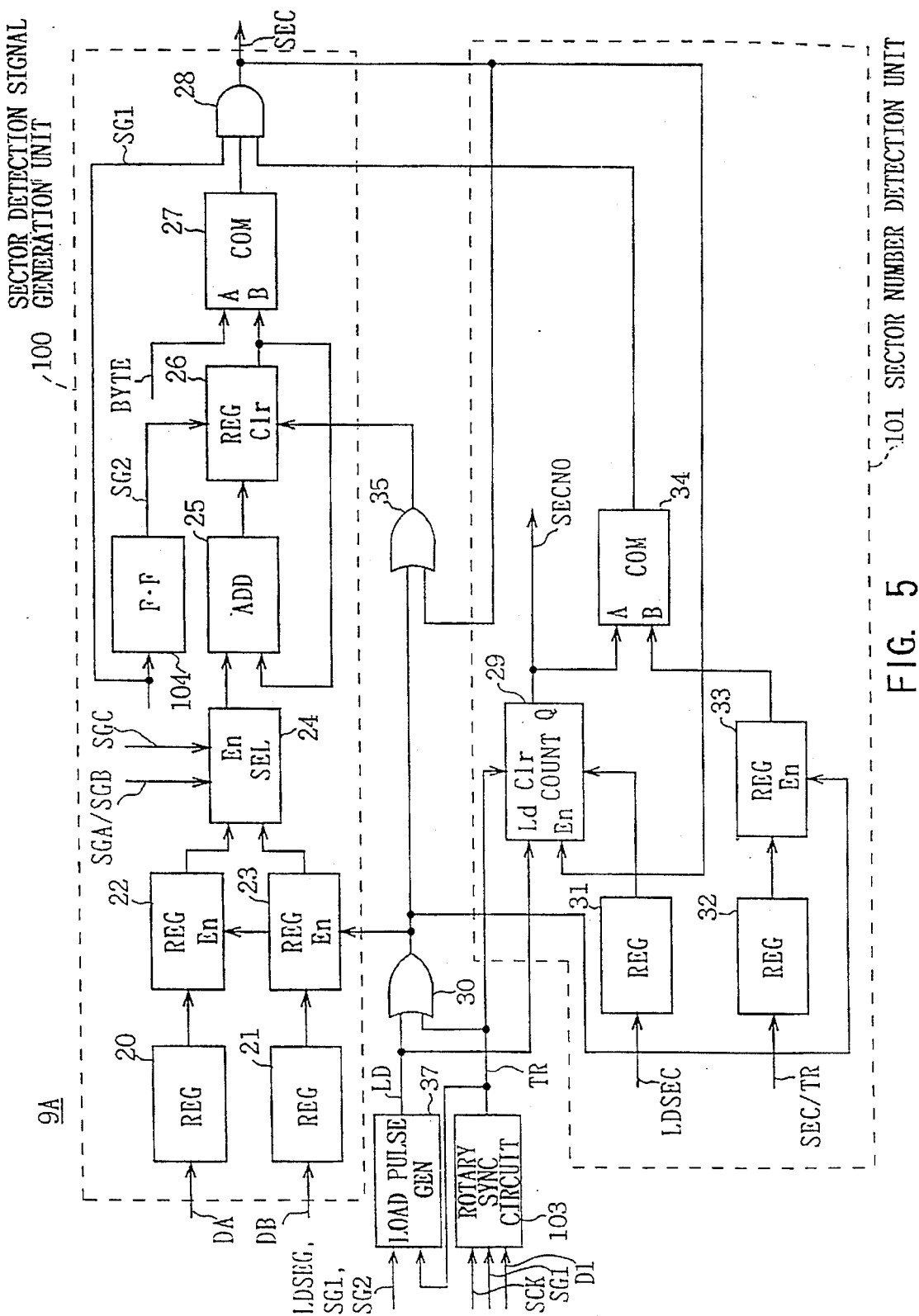
FIG. 5 is a block diagram showing a timing generator.

Practically, the timing generator 9 has a construction shown in FIG. 5. The timing generator 9A in FIG. 5 is composed of a sector detection signal generation unit 100 for generating the sector detection signal SEC, and a sector number detection unit 101 for detecting sector number by counting the sector detection signal SEC.

Segment data DA showing the data volume which is recordable in the segment SGA or segment data DB showing the data volume which is recordable in the segment SGB is input from the system control unit 16 to the sector detection signal generation unit 100. The sample servo method is used in the optical disc 2, thus it is completely recognized where the optical beam is scanning at present in the optical disc 2, i.e., which segment is being accessed.

The sector detection signal generation unit 100 transfers segment data DA and DB via registers 20 and 21 to registers 22 and 23, respectively. Further, the segment data DA and DB of zone or track in which the optical beam is to scan next time is input to the registers 20 and 21, respectively. When the scanning position of the optical beam is shifted to next zone or track, the segment data DA and DB each retained in the registers 20 and 21 are respectively transferred to the registers 22 and 23 based on the output from an OR circuit 30. In this embodiment, the segment data DA and DB in the same zone does not change even if the track is shifted, so that the segment data having same value is transferred.

In this manner, the sector detection signal generation unit 100, even if the zone ZO1, ZO2, . . . on which the optical beam scans is switched, can continue processing promptly by using the segment data DA and DB according to the switched zone.

Furthermore, the sector detection signal generation unit 100 switches operation of a selector 24 according to switching signals SGA, SGB, and SGC. More specifically, the segment data DA or DB is selected and output according to accessed segment, and further outputting of the segment data DA and DB is stopped. Namely, the selector 24 outputs the segment data DA retained in the register 23 if the switching signal SGA showing that the optical beam is scanning in the segment SGA is input. On the contrary, if the switching signal SGB showing that the optical beam is scanning in the segment SGB is input, the selector 24 outputs the segment data DB retained in the register 23. When the switching signal SGC showing that the optical beam is scanning in the segment SGC is input, the selector 24 outputs nothing.

An adding circuit 25 add the output of this selector 24 and the accumulated data stored in the register 26, and outputs it to the register 26. The register 26 captures the output data of the adding circuit 25 when the second segment pulse SG2 (FIG. 4(D)) of which signal level rises with the dropping of the first segment pulse SG1 comes. As a result, the adding circuit 25 and the register 26 accumulatively add the segment data DA, DB (FIG. 4(F)) outputted from the selector 24 following the scanning of optical beam. The second segment pulse SG2 is generated by delaying the first segment pulse by a flip-flop 104.

The first segment pulse SG1 (FIG. 4(C)) is a signal which rises while the optical beam is scanning in the servo area SB, and the second segment pulse SG2 (FIG. 4(D)) is a signal which rises at the point of time when the first segment pulse SG1 drops. Incidentally, the first and second segment pulses SG1 and SG2 can be easily obtained by frequency dividing the servo clock SCK.

Furthermore, the sector detection signal SEC is input via an OR circuit 35 to a clear terminal of the register 26. Thereby, the register 26 clears this value of accumulative addition at the head of each sector. Consequently, the register 26 retains the value of accumulative addition from the head of sector to the segment where the optical beam is scanning at present. The register 26 transmits this value of accumulative addition to following comparator circuit 27. The reference data BYTE showing the data volume for one sector is input from the system control unit 16 to an input terminal A of the comparator circuit 27, and the output data of register 26 is input to the other input terminal B. Here, the disc apparatus of this embodiment accesses data by the sector unit composed of the fixed data volume, and the reference data BYTE is a constant value. The comparator circuit 27 outputs the comparison result of this reference data and the value of accumulative addition retained in the register 26. Actually, if the value of accumulative addition from the top of sector becomes more than the reference data BYTE, the comparator circuit 27 rises the signal level of output signal judging that the scanning of one sector has been finished and the scanning of the following segment has started.

An AND circuit 28 obtains the logical product of the comparison result of the comparator circuit 27 and the first segment pulse SG1, and outputs the sector detection signal SEC of which signal level rises at the top of sector. Therefore, the top of sector can be surely detected.

In this manner, in the sector detection signal generation unit 100, sector is detected by accumulatively adding the data volume recordable in each segment corresponding to the segment in which the optical beam is scanning. Therefore, the sector detection signal SEC synchronizing with each sector can be surely and easily obtained when recording and reproducing.

Furthermore, since the sector detection signal generation unit 100 provides the registers 20 and 22, the registers 21 and 23 each connected in series, the accumulation adding calculation based on the segment data DA and DB of next zone can be promptly executed even if the zone changes. As a result, even in the case where the zone changes, the sector can be detected by effectively avoiding the waiting of rotation of the disc due to the time required for data setting, and thus, the data transmission rate can be improved.

The sector number detection unit 101 inputs the sector detection signal SEC output from the sector detection signal generation unit 100 to a sector counter 29, and detects sector number by counting pulse number of the sector detection signal SEC in the sector counter 29.

Here, under the normal operating condition, the sector counter 29 sets the count value to "0" by the track pulse TR (FIG. 4(B)) which rises in the presence of position of the reference segment K, and then counts the sector detection signal SEC. Thus the sector counter 29 can detect sector number SECNO which shows in what number of sector from the reference segment K the optical beam is scanning.

Here, the track pulse TR can be obtained by a rotary synchronizing circuit 103. The rotary synchronizing circuit 103 extracts information corresponding to the tangential information area out of the output D1 from the analog-to-digital conversion circuit 7 based on the segment pulse SG1 generated on a specified position in each segment, and obtains angular information. Then, when the angular information shows a predetermined angle, the rotary synchronizing circuit 103 generates the track pulse TR at the timing of corresponding to the servo clock SCK.

Then, in the case of detecting the sector number SECNO based on the reference segment K after clearing the sector counter 29 by track pulse TR, when successive recording track is accessed and the zone is changed, sectors of the following zone can be successively detected by transmitting the data stored in registers 20, 21 and 32 at the end of zone to the following registers 22, 23 and 33.

However, in the case where the zone is changed upon seeking, data clock DCK is changed and the sector number for one track is also changed. Therefore, it is after becoming the data clock DCK stable and further being the reference segment K accessed that the correct sector number SECNO can be detected at the sector counter 29. Therefore, there occurs a problem that it have to take times to record and reproduce data after seeing.

Therefore, load pulse LD from a load pulse generation circuit 37, load sector LDESC from the system control unit 16, and sector number data SEC/TR are supplied to the sector number detection circuit 101.

As a result, in the basis of the load pulse LD, the sector counter 29 loads the load sector LDSEC input from the system control unit 16 via the register 31, and then counts the sector detection signal SEC from this loaded value.

With this arrangement, the sector number detection unit 101 counts the sector detection signal SEC successively from the value of the load sector LDSEC without waiting for accessing to the reference segment K, to obtain the sector number SECNO. Therefore, access time can be remarkably shortened.

Figure 6:
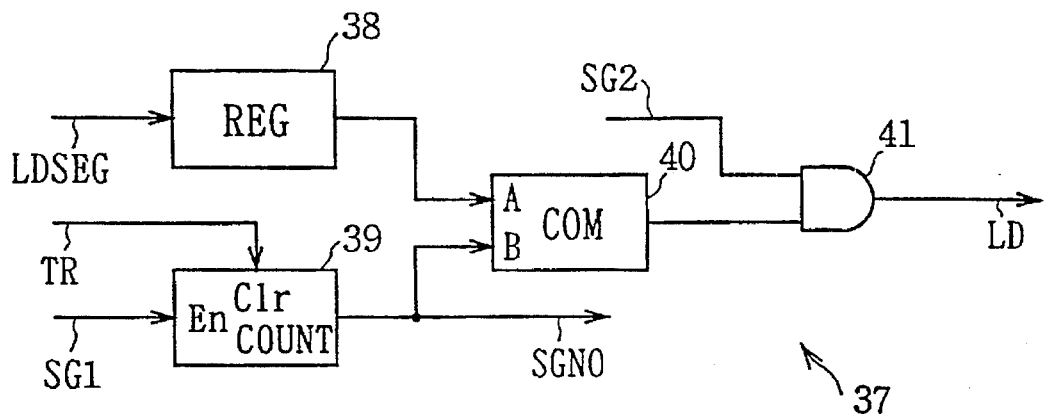
FIG. 6 is a block diagram showing a load pulse generation circuit.

As shown in FIG. 6, in the load pulse generation circuit 37, segment pulse SG1 is input to an enable terminal of a counter 39 and simultaneously, the track pulse TR is input to a clear terminal. Therefore, the counter 39 counts the segment pulse SG1 and clears the counted value each time the track pulse TR is supplied. As a result, the counter 39 detects the segment number SGNO of the segment which is actually accessed by optical beam on the basis of the reference segment K.

The segment number SGNO is input to the comparator circuit 40. Further, count value LDSEG of which segment counter is built in the system control unit 16 is input via a register 38 to the comparator circuit 40. When the segment number SGNO coincides with loaded count value LDSEG, the comparator circuit 40 rises comparison output.

Furthermore, the load pulse generation circuit 37 obtains logical product of the comparison output and the second segment pulse SG2 at an AND circuit 41, thus generates load pulse LD.

With this arrangement, the load pulse generation circuit 37 outputs the load pulse LD when the segment in which the optical beam is scanning becomes the segment designated in the system control unit 16.

The timing generator 9A outputs the sector number SECNO as the data synchronizing signal DSYNC to the data detection circuit 15 and the modulation circuit 17 together with the sector detection signal SEC. The data detection circuit 15 demodulates the user data for the desired sector on the basis of the data synchronizing signal DSYNC. The modulation circuit 17 modulates the recording data on the basis of the data synchronizing signal DSYNC.

Furthermore, the timing generator 9A gives the sector number data SEC/TR showing the sector number per one track which is previously set in the system control unit 16 via the registers 32 and 33 to the comparator circuit 34. Here, the register 33 inputs the load pulse LD or the track pulse TR as an enable signal via the OR circuit 30, thus transfers the contents of the register 32 to the register 33 by the load pulse LD generated at the segment in which zone changes. As a result, even if the zone changes, the sector number data SEC/TR according to the zone can be promptly given to the comparator circuit 34.

The comparator circuit 34 compares the sector number data SEC/TR with the count value of the sector counter 29 so as to detect whether or not the count value of the sector counter 29 reaches the sector number in one track. Then, when the comparison result showing that the count value reaches that sector number is obtained, the comparator circuit 34 gives mask signal which is low level to the AND circuit 28. Therefore, it can be prevented from generating needless sector detection signal SEC from the sector detection signal Generation unit 100.

More specifically, it can be prevented that the sector detection number SEC is Generated at the top of segment on the end of the track in which no user data is allocated.

Here, the segment number SGNO is generated based on the servo clock SCK and the segment pulse SG1 which is generated from the servo clock SCK. Furthermore, since information about this servo clock SCK is recorded radially on the disc, it can be obtained while seeking. Therefore, since the segment number SGNO can be obtained while seeking, synchronization does not deviate.

Figure 7:
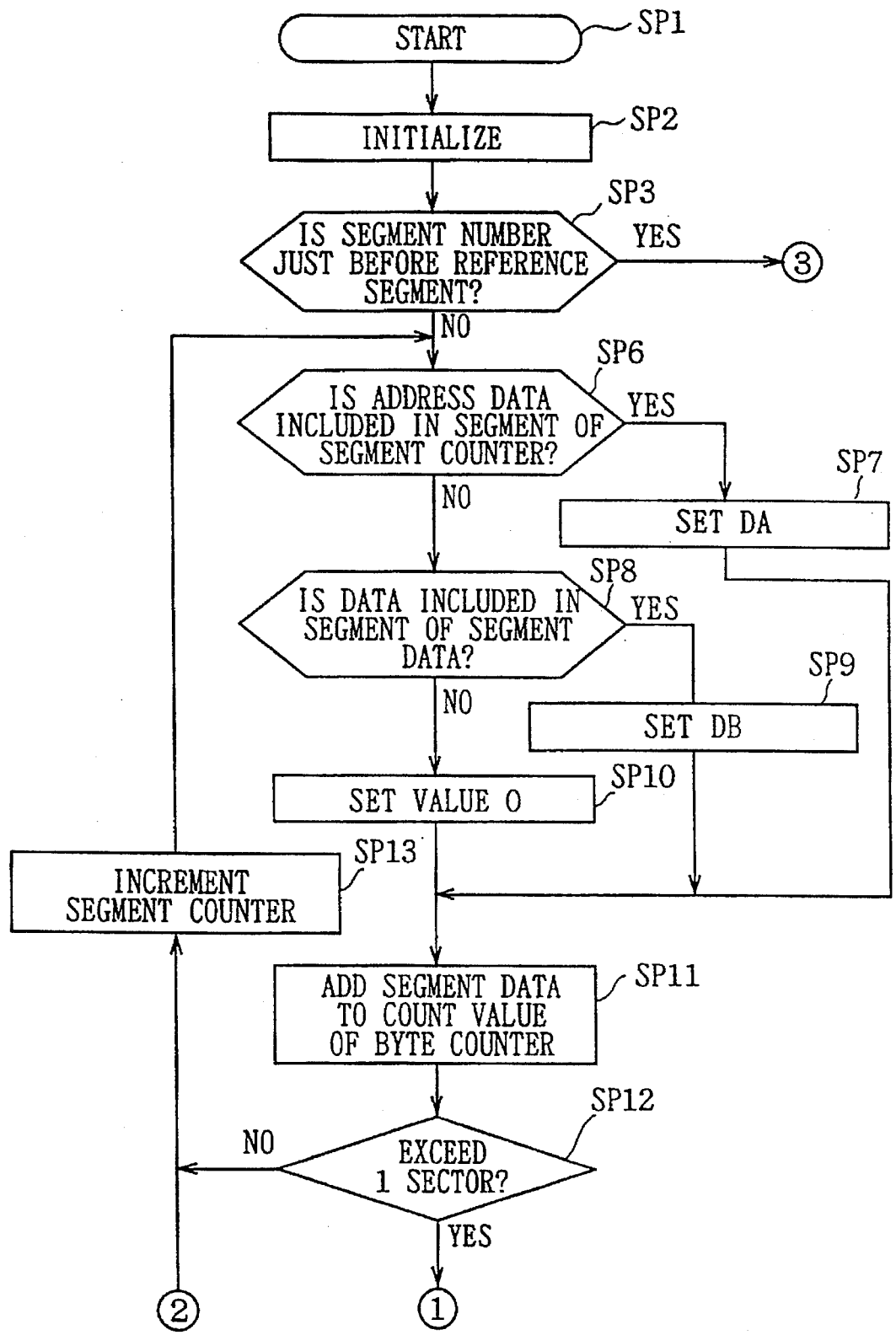
FIGS. 7 and 8 are flow charts explaining sector detection processing.
Figure 8:
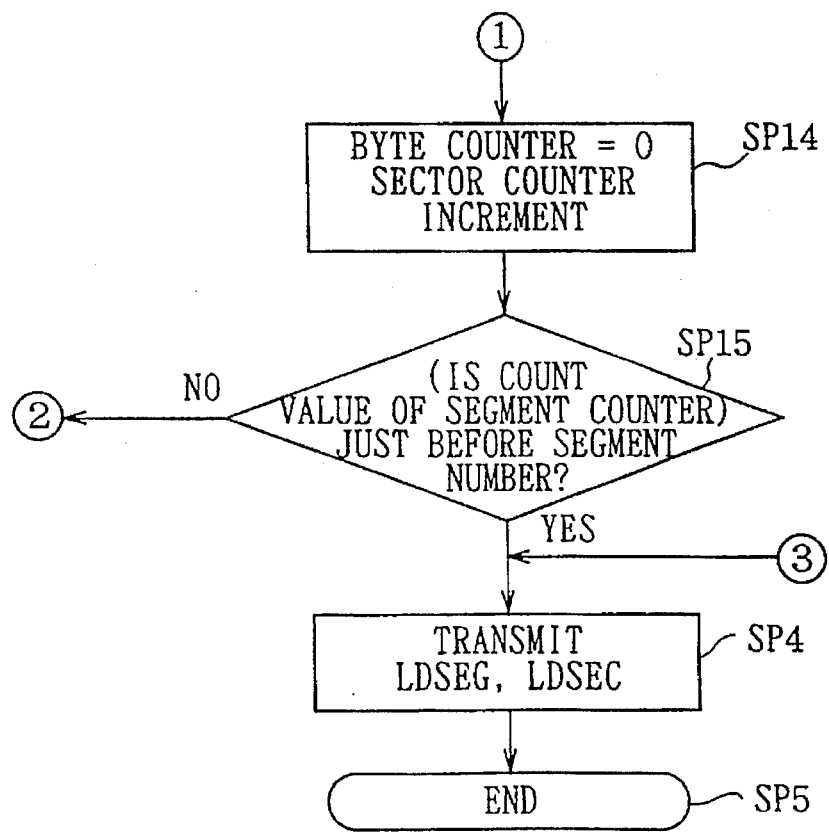

With this arrangement, the frequency of the data clock DCK can be previously set to the frequency corresponding to the zone to be seeked. Then, the processing procedure shown in FIGS. 7 and 8 is executed after the data clock become stable to the fixed frequency, thus the sector number and the segment number being accessed, i.e., the sector LDSEC and the load segment LDSEG can be detected.

The system control unit 16 performs software-like processing, and hereinafter, the description will be made assuming that byte counter, sector counter, and segment counter are built in.

The system control unit 16 proceeds from step SP1 to step SP2 to set the count values of the built-in byte counter, sector counter and segment counter to the value 0 respectively to initialize.

Then, the system control unit 16 proceeds to step SP3 and judges whether or not either of the following equations are satisfied:

$$SGNO+Y \geq MAX\ SEGMENT \qquad (1)$$

$$SGNO+X \leq MAX\ SEGMENT \qquad (2)$$

thereby judges whether or not the segment number SGNO is immediately before the reference segment.

Here, "MAX SEGMENT" is the segment number which is maximum in one track, "X" designates a value for leaving time surplus until the load pulse LD is issued and the register 26 and the sector counter 29 can be set after the load segment LDSE set at the system control unit 16 is detected, and "Y" shows a value for leaving time surplus in case of obtaining synchronism at the sector "0".

If an affirmative result is obtained at step SP3, the system control unit 16 proceeds to step SP4 to send out count values of the segment counter and the sector counter as the load segment LDSEG and the load sector LDSEC respectively to the timing generator 9A, and then proceeds to step SP5 to terminate this processing procedure.

On the other hand, if a negative result is obtained, the system control unit 16 proceeds to step SP6 and judges whether or not the address data is recorded with the user data on the segment to be assigned by the segment counter (i.e., judges whether or not it is the first segment SGA described above in FIG. 4).

If an affirmative result is obtained at step SP6, the system control unit 16 proceeds to step SP7 and sets segment data DA showing the data volume of this segment.

On the other hand, if a negative result is obtained at step SP6, the system control unit 16 proceeds to step SP8 and judges whether or not the user data is recorded on the segment to be assigned by the segment counter (i.e., judges whether or not it is the second segment SGB described above in FIG. 4).

At this point, if an affirmative result is obtained, the system control unit 16 proceeds to step SP9 and sets segment data DB showing the data volume of this segment. On the other hand, if a negative result is obtained (this case applies to the third segment SGC described above in FIG. 4), the system control unit 16 proceeds to step SP10 and sets the data volume of value "0".

Then, the system control unit 16 proceeds to step SP11 to add the set value respectively set at steps SP7, SP9 and SP10 to the byte counter, and then proceeds to step SP12 to judge whether or not the following equations are satisfied:

$$\text{BYTE COUNT} \geq \text{BYTE SECTOR} \quad (3)$$

$$\text{BYTE LENGTH} \neq 0 \quad (4)$$

thus judges whether or not the count value of this byte counter exceeds for one sector.

Here, "BYTE COUNT" shows the count value of byte counter, "BYTE SECTOR" shows the number of bytes of one sector, and "BYTE LENGTH" shows the set value of the data volume set immediately before.

At this point, if a negative result is obtained, the system control unit 16 proceeds to step SP13 to increment the count value of segment counter by one and returns to step SP6.

With this arrangement, the system control unit 16 repeats the processing procedures of steps SP6-SP7-SP11-SP12-SP13-SP6, steps SP6-SP8-SP9-SP11-SP12-SP13-SP6, or steps SP6-SP8-SP10-SP11-SP12-SP13-SP6, and successively accumulatively adds the data volume from the reference segment K to the segment to be assigned by the segment counter in the same manner as that of the adder 25 and the register 26 of the sector detection signal generation unit 100.

At this point, the system control unit 16 accumulatively adds the data volume, synchronizing with the access of data. On the other hand, the system control unit 16 detects successively the value of accumulation and addition as a software at the high velocity regardless of accessing. Accordingly, if the data volume accumulatively added exceeds for one sector, an affirmative result is obtained at step SP12 and then the system control unit 16 proceeds to step SP14.

At this point, the system control unit 16 sets the value of byte counter to the value "0" and simultaneously increments the sector counter by one, and then proceeds to step SP15 to judge whether or not it satisfies the following equation:

$$\text{SGNO}+X<\text{SEGMENT COUNT} \quad (5)$$

thus judges whether or not the segment to be detected at the counter 39 is immediately before the segment to be assigned by the segment counter.

With this arrangement, when an affirmative result is obtained at step SP15, the system control unit 16 proceeds to step SP4 to start counting operation of the timing generator 9A from the sector followed by the sector starting from the reference segment K.

On the other hand, if a negative result is obtained at step SP15, the system control unit 16 proceeds to step SP13 and accumulatively adds the data volume on the following sectors.

In this manner, the system control unit 16 detects the sector which is accessed next time, and controls the timing generator 9A so that the timing generator 9A starts the sector detection processing based on the top segment of this sector detected in place of the reference segment. Accordingly, the time required for accessing can be shortened in general.

Figure 9:
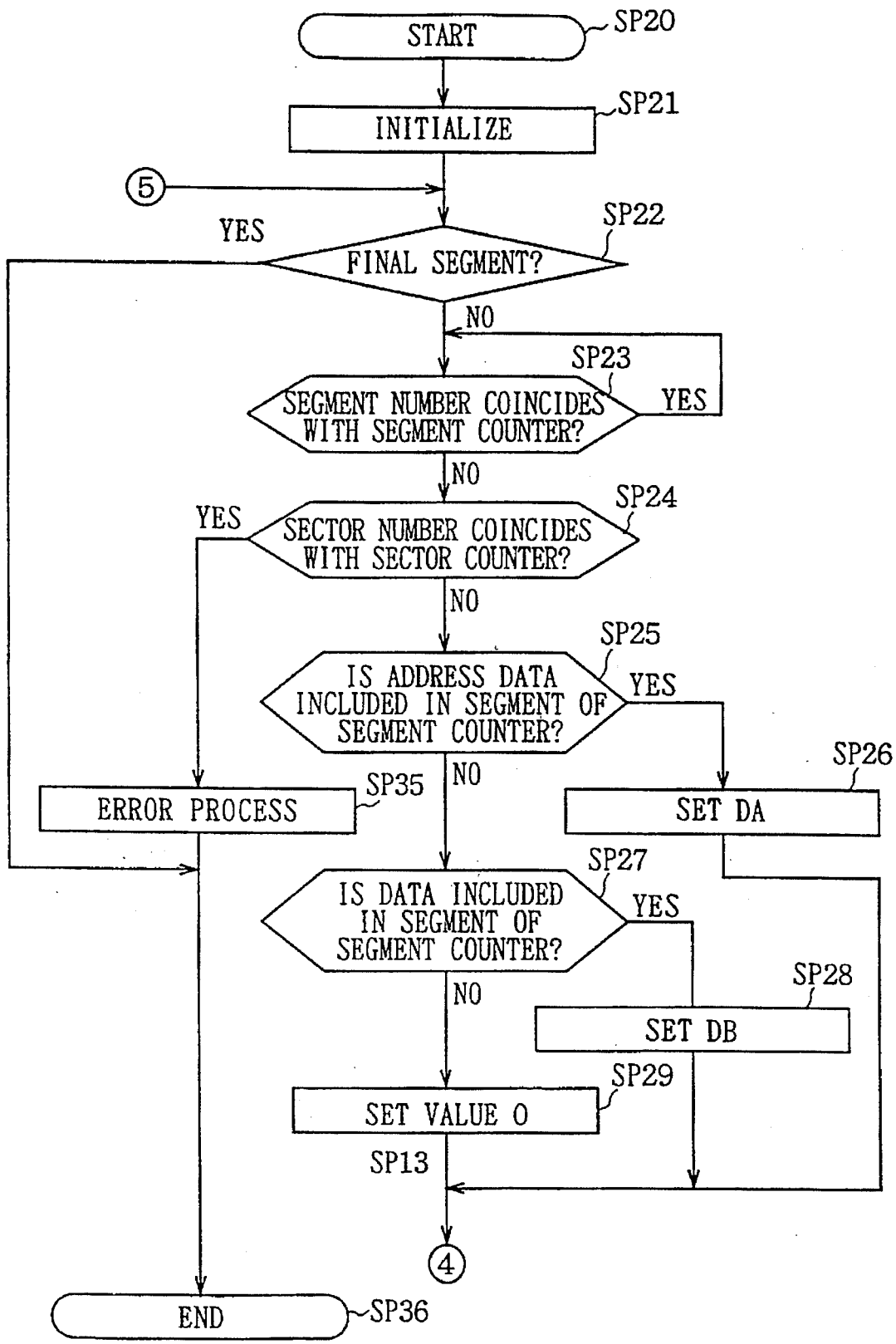
FIGS. 9 and 10 are flow charts explaining lock detection processing.
Figure 10:
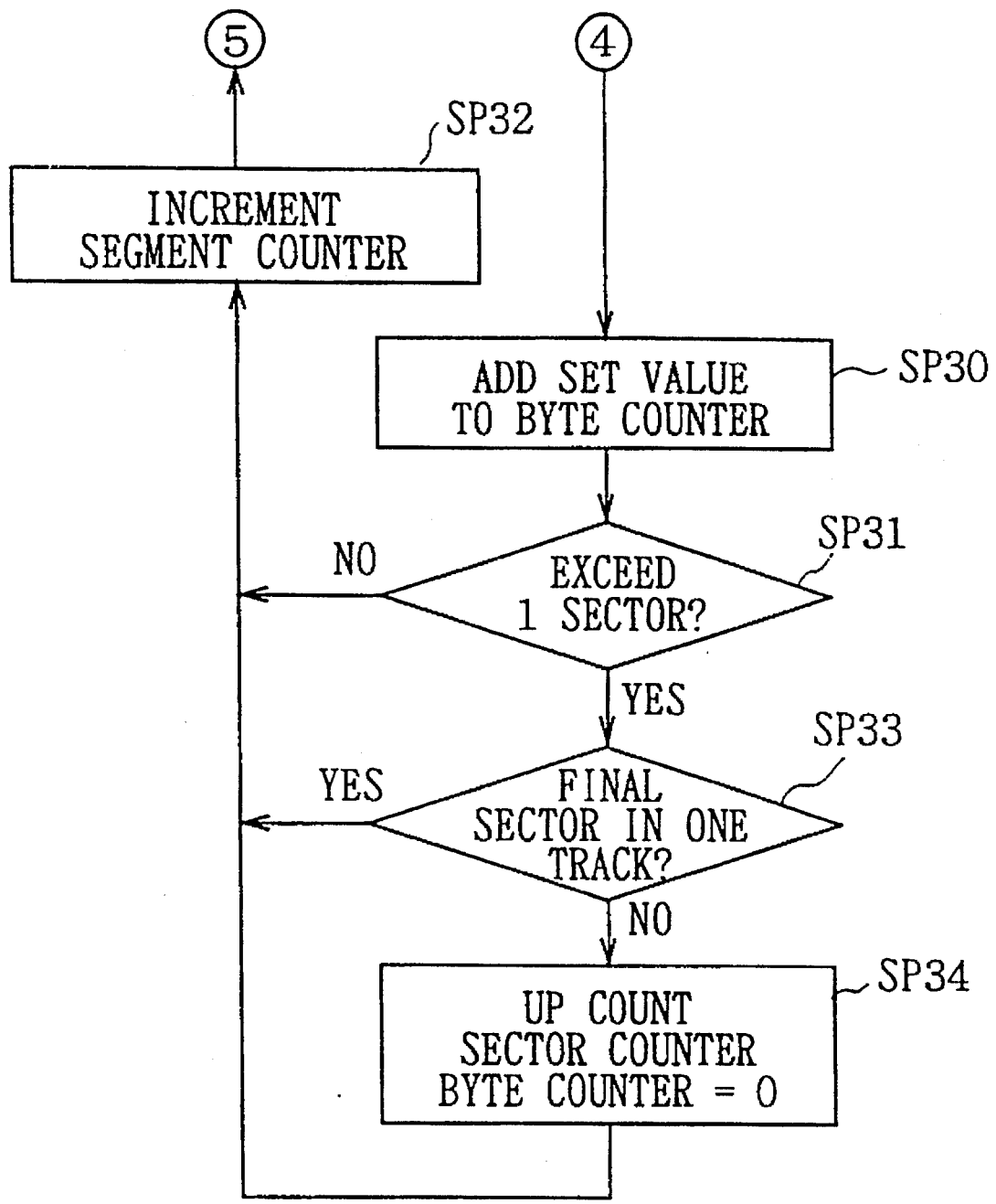

Then, in the case of detecting sectors as described above, if the synchronization between the operation of the timing generator 9A and the scanning of optical beam becomes deviated, sectors cannot be detected correctly. Hence, the system control unit 16 judges whether or not the timing generator 9A detects sectors correctly by performing lock detection processing shown in FIGS. 9 and 10 at and after starting the power source with the prescribed cycle.

More specifically, the system control unit 16 proceeds from step SP20 to step SP21 to set the count value of the byte counter, counter, and segment counter to the value "0" respectively and initializes them. Then, the system control unit 16 proceeds to step SP22 to judge whether or not the segment to be assigned by the segment counter has past the final segment of the optical disc 1. Here, if a negative result is obtained, the system control unit 16 proceeds to step SP23.

At step SP24, the system control unit 16 Judges whether or not the sector number SECNO detected at the counter 39 coincides with the count value of sector counter, and if a negative result is obtained, proceeds to step SP25. Then, the system control unit 16 judges whether or not the address data is recorded together with the user data on the segment to be assigned by the segment counter. And if an affirmative result is obtained at step SP25, the system control unit 16 proceeds to step SP26 and sets the segment data DA showing the data volume of this segment.

On the other hand, if a negative result is obtained at step SP25, the system control unit 16 proceeds to step SP27 and judges whether or not the user data is recorded on the segment to be assigned by the segment counter. If an affirmative result is obtained at step SP27, the system control unit 16 proceeds to step SP28 and sets the segment data DB showing the data volume of this segment. On the other hand, if a negative result is obtained at step SP28, the system control unit 16 proceeds to step SP29 to set the segment data showing the data volume of the value "0".

With this arrangement, after setting the data volume of segments to be assigned by the segment counter respectively, the system control unit 16 proceeds to step SP30. At step SP30, the system control unit 16 adds the segment data respectively set at steps SP26, SP27 or SP29 to the count value of the byte counter, and then proceeds to step SP31. At step SP31, the system control unit 16 judges whether or not both equations (3) and (4) are satisfied, thus judges if the count value of this byte counter exceeds the count value for one sector.

If a negative result is obtained at step SP31, the system control unit 16 proceeds to step SP32. At step SP32, the system control unit 16 increments the count value of segment counter for only the value one, and then returns to step SP22. Then, the system control unit 16 repeats processing procedures of steps SP22-SP23-SP24-SP25-SP26-SP30-SP31-SP32-SP22, steps SP22-SP23-SP24-SP25-SP27-SP28-SP30-SP31-SP32-SP22, or steps SP22-SP23-SP24-SP25-SP27-SP29-SP30-SP31-SP32-SP22. Therefore, the system control unit 16 successively up counts the count value of segment counter on each sector to compare the segment number SGNO and the count value of segment counter.

Thus, when the comparison processing of the segment number SGNO and the count value of segment counter on a sector is completed, an affirmative result is obtained at the step SP31, so that the system control unit 16 proceeds to step SP33. Then, at step SP33, the system control unit 16 judges whether or not the sector assigned by the sector counter is the last sector in one track.

If a negative result is obtained, the system control unit 16 proceeds to step SP34. At step SP34, the system control unit 16 sets the value of byte counter to the value "0" and simultaneously increments the sector counter by one. And then the system control unit 16 proceeds to step SP32.

With this arrangement, the system control unit 16 successively steps up sectors assigned by the sector counter and compares the segment number SGNO and the count value of the segment counter.

In this series of processings, when the timing generator 9 is correctly synchronizing and operating, an affirmative result is obtained at step SP24. Accordingly, the system control unit 16 repeats the processing procedure described above till the final sector. And at the final sector of one track, an affirmative result is obtained at step SP31. Consequently, the system control unit 16 skips the processing procedure of step SP34 and returns from step SP32 to step SP22 directly. With this arrangement, since an affirmative result is obtained at step SP22, the system control unit 16 proceeds to step SP35 and completes this processing procedure and records and reproduces user data by driving the laser control circuit 4, and so on.

On the other hand, in the case where timing generator 9 is not correctly synchronized and operating, an affirmative result is obtained at some timing at step SP24 and then, proceeds to step SP35. In this case, the system control unit 16 judges that some abnormalities occur and sets a flag of abnormality occurrence and then, proceeds to step SP36 to terminate this processing procedure.

In this manner, in the case where read and write command is inputted from the host computer, etc., the system control unit 16 transmits the control code showing the occurrence of abnormality to the host computer without executing the read/write processing depending upon this flag of abnormality occurrence. Thus, the optical disc apparatus 2 is arranged not to record and reproduce sectors erroneously and thus, the overall reliability can be improved.

(3) Effects of the Embodiment

According to the foregoing construction, the data volume which can be recorded in each segment is read out from the system control unit 16 and accumulatively added synchronizing with the accessing, and the sectors are detected depending on the result of accumulation and addition, the sector of the optical disc 1 applied sample servo and zone CAV can be certainly detected and the desired data can be recorded and reproduced.

(4) Other Embodiments

Figure 11:
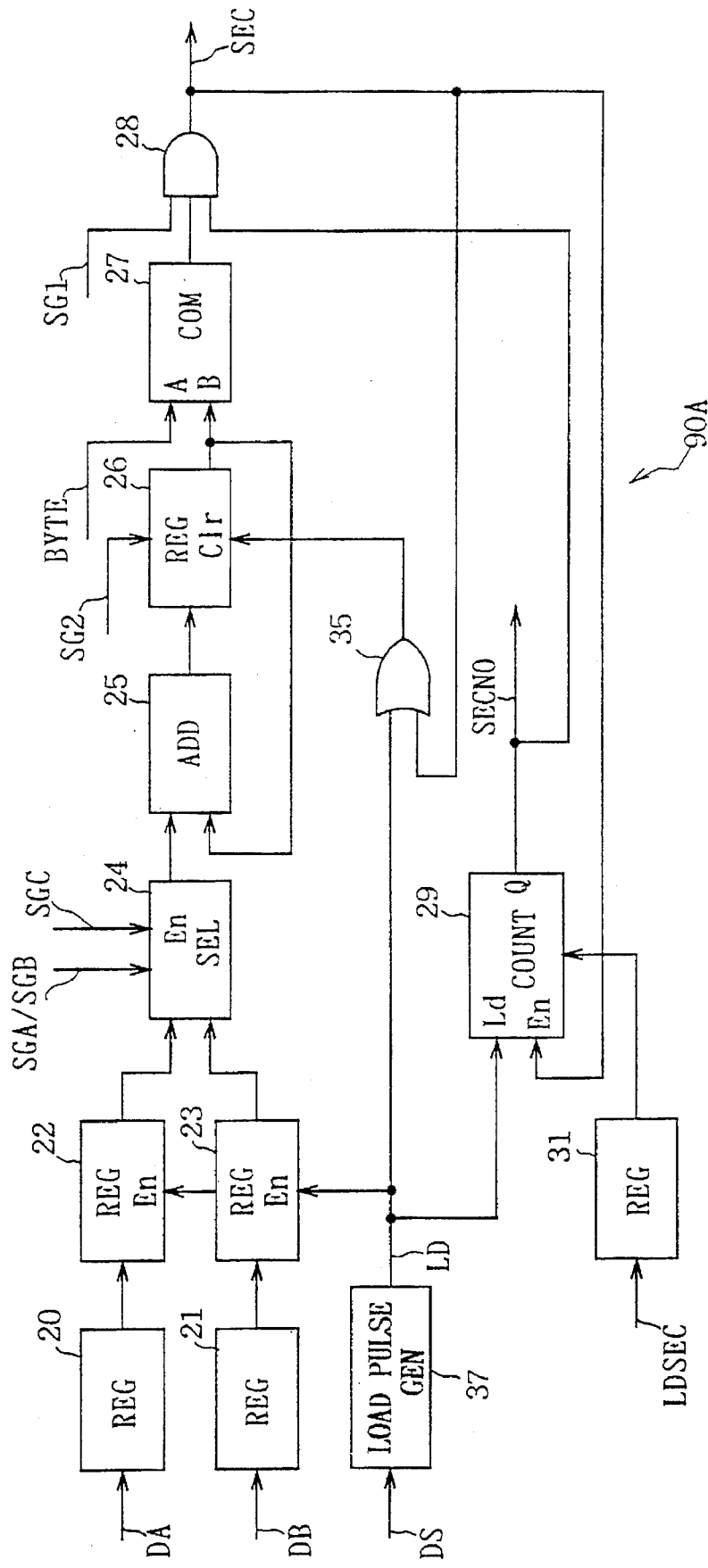
FIG. 11 is a block diagram showing a timing generator according to other embodiment.

In the embodiment described above, the track pulse TR which rises immediately before the reference segment K is generated by the track pulse generation circuit 103, and the sector number SECNO is numbered in every track by being cleared the sector counter 29 by the track pulse TR, and simultaneously, the sector is completed in every track by clearing the register 26 by the track pulse TR. However, the present invention is not only limited to this, but, as shown in FIG. 11, a timing generator 90A can be used in which the track pulse generation circuit 37 is omitted instead of the timing generator 9A.

Here, in the case where the timing generator 90A is used, remaining segment which cannot construct sector before the reference segment K such as described in the embodiment is not made, thereby the recording density can be further increased. Moreover, it is possible to put successional sector number SECNO in every zone.

Furthermore, in the embodiment described above, the registers 20 and 22, and 32 and 33 are connected in series, respectively. However, the present invention is not only limited to this, but the point is that the first register for storing the segment data DA and DB regarding the zone in which the access means 5 is presently accessing, and the second register for storing the segment data for next zone are provided, and when the zone is changed, the stored value of the second register is output.

Furthermore, in the embodiment described above, the present invention is applied to the optical disc 1 having three segments SGA, SGB, and SGC. However, the present invention is not only limited to this, but when the kind of segment increases, the segment data corresponding to these kinds can be stored.

Furthermore, in the embodiment described above, the recording track is formed helically. However, the present invention is not only limited to this, but can be applied to the case where the recording track is formed concentrically.

Furthermore, in the embodiment described above, the lock detection processing is executed by polling. However, the present invention is not only limited to this, but the lock detection processing can be executed by applying the method of interruption.

Furthermore, in the embodiment described above, the present invention is applied to the optical disc apparatus 2 which records and reproduces data on the recordable/reproducible optical disc 1. However, the present invention is not only limited to this, but can be widely applied to an optical disc apparatus which reproduces the data of an optical disc for reproduction only such as CD (compact disc), an optical disc apparatus which is applied to an optical disc of write-once type, or a magnetic disc apparatus which records and reproduces data on the magnetic disc such as a hard disc or a floppy disc. According to the present invention as described above, in the disc apparatus performing access of an information signal with the zone CAV method on a disc-shaped recording medium which is divided into a plurality of zones in the radial direction to form the recording area of one segment between respective servo areas, access means for performing access of the information signal on the disc-shaped recording medium by sector unit composed of N segments (N is a positive integer), segment data volume setting means for setting data volume corresponding to the kinds and the zones in every segment formed between respective servo areas, accumulation adding means for accumulatively adding the data volume of each segment unit from said data volume of a reference segment provided at least one in each zone up to and including said data volume of that segment unit corresponding to the access position of the access means by segment unit, setting comparing value showing the data volume of sector in every zone, sector detection signal outputting means for outputting the sector detection signal when value of accumulative addition by the accumulation adding means becomes the comparing value, reset means for resetting the value of accumulative addition according to the sector detection signal, and sector number detection means for detecting accessing sector number of the access means according to the sector detection signal, are respectively provided, thereby the optical disc apparatus which is capable of detecting sectors and capable of recording and reproducing the desired data can be obtained with certainty.

Industrial Applicability

The disc apparatus according to the present invention can be utilized in the case of reproducing the data recorded on the optical disc such as the compact disc and the laser disc, and in the case of recording and reproducing recording data on the magneto-optical disc and the magnetic disc.

I claim:

1. A disc apparatus performing access of information signal on a CAV recording disc which is divided into a plurality of zones in the radial direction, to form a servo area radially in each zone, and further to form a recording area of one segment between respective servo areas, comprising:

access means for performing access of said information signal on said disc-shaped recording medium by sector unit composed of N segments (N is a positive integer);

segment data volume setting means for setting data volume based upon kind of segments and zones in every segment formed between said respective servo areas;

accumulation adding means for accumulatively adding the set data volume of each segment from the data volume of a reference segment provided at least one in said each zone and including the data volume of that segment corresponding to the access position of said access means by segment;

sector data volume setting means for setting a comparing value showing data volume of said sector unit in said each zone;

sector detection signal outputting means for outputting sector detection signal when accumulative addition value of said accumulation adding means becomes said comparing value;

reset means for resetting said value of accumulative addition value according to said sector detection signal; and sector number detection means for detecting accessing sector number of said access means according to said sector detection signal.

2. The disc apparatus according to claim 1, wherein:

said reference segment is provided once in one track.

3. The disc apparatus according to claim 2, comprising:

sector number data setting means for setting per zone sector number data showing the number of recordable sector in one track; and mask means for masking said sector detection signal when said sector number data and said sector number become predetermined relation.

4. The disc apparatus according to claim 1, wherein:

said segment data volume setting means provides first register for storing segment data showing said data volume in each kind of said segment to the zone now being accessed by said access means; and second register for storing said segment data in each kind of segment to the zone to be accessed next time by said access means.

5. The disc apparatus according to claim 1, wherein:

said segment has at least a segment composed of address data area and recording data area, and a segment composed of only recording data area.

6. The disc apparatus according to claim 1, wherein:

said sector number detection means has a counter for counting said sector detection signal, and reset means for resetting count value of said counter to a specified value when said access means accesses said reference segment.

7. The disc apparatus according to claim 4, wherein:

said segment data volume setting means previously sets said segment data of the zone after seeking to said second register before seek operation;

and changes set status of said segment data by transmitting said segment data stored in said second register to said first register.

8. The disc apparatus according to claim 1, comprising:

calculation means for calculating sector number on the objective position when seeking;

termination means for terminating recording or reproducing operation by said access means when the sector number obtained by said calculation means does not correspond to the sector number obtained by said sector number detection means.

* * * * *